No. 624,537. Patented May 9, 1899.
C. B. PROVINS.
SPECULUM.
(Application filed Jan. 16, 1899.)
(No Model.)
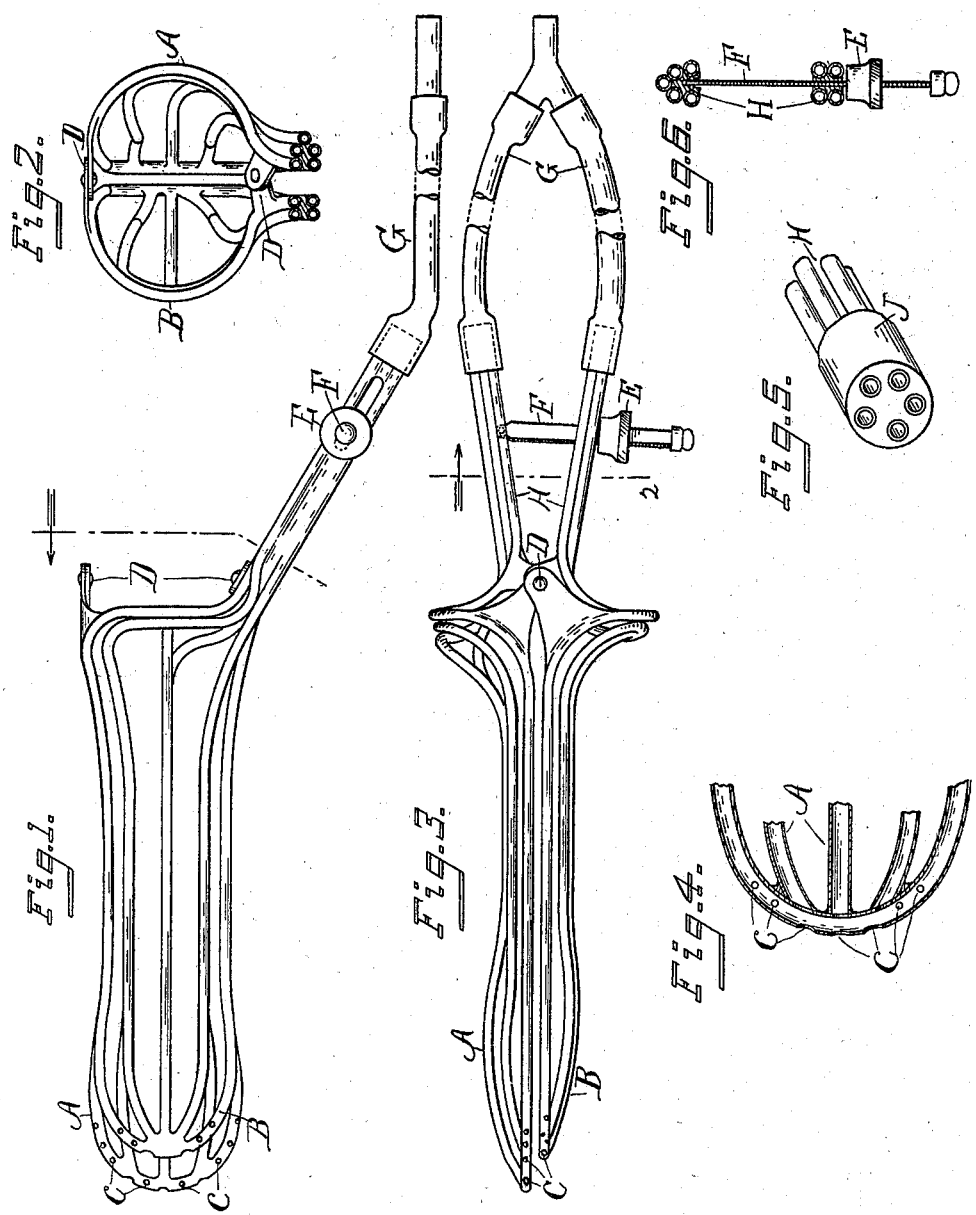

UNITED STATES PATENT OFFICE.

CLARK B. PROVINS, OF OTTAWA, ILLINOIS.

SPECULUM.

SPECIFICATION forming part of Letters Patent No. 624,537, dated May 9, 1899.

Application filed January 16, 1899. Serial No. 702,262. (No model.)

*To all whom it may concern:*

Be it known that I, CLARK B. PROVINS, a citizen of the United States of America, residing at Ottawa, in the county of La Salle and State of Illinois, have invented certain new and useful Improvements in Speculums, of which the following is a specification, reference being had therein to the accompanying drawings.

This invention relates to certain improvements in speculums for use in dilating passages of the body, which improvements are fully set forth and explained in the following specification and claim, reference being had to the accompanying drawings, and the letters of reference thereon, forming a part of this specification, in which—

Figure 1 is a side elevation of the speculum. Fig. 2 is a cross-sectional view of Fig. 1, taken on line 1, looking in the direction of the arrow. Fig. 3 is a top plan view of the speculum. Fig. 4 is a central section of the forward end of one of the blades for showing its tubular construction. Fig. 5 is a perspective view of the end of one of the handles, the rubber supply-tube being removed; and Fig. 6 is a cross-sectional view of Fig. 3, taken on line 2, looking in the direction of the arrow toward the screw-rod and its set-nut for dilating the blades and showing the brazing in section for connecting the tubular wires forming the handles.

Referring to the drawings, A and B represent the two blades of the speculum, hinged together at D in the ordinary manner. The blades A and B are made of tubes bent to make the form of blade required. The intermediate tubular members of each blade connect at their forward ends with the border tubular member at the point of the blade in such manner as to communicate therewith, as shown more particularly in Fig. 4, and so that material within the tubular members of the blades may escape through the perforations C. The rear ends of the tubular members of the blades extend beyond the hinge D to form handles H, respectively for each blade, and connected at their ends by means of brazing J, so a rubber supply-pipe G may be slipped on their ends, so that any desired medicine or material may pass from some source of supply through said supply-pipe and tubular handles and blade members and be discharged from the outlets or perforations C into the body. One of the handles H is provided with a screw-threaded rod pivotally connected thereto and passing through the opposite handle, as shown in Fig. 6, which rod is provided with a nut E, all for the purpose of dilating and holding dilated the two blades A and B when the speculum is used.

It will be seen that the speculum is made wholly of tubes its entire length, comprising the blades and handles, and pivotally connected, so that when the handles are compressed the blades open from each other to dilate and hold dilated the parts, as stated, so that ample space is obtained for making minor operations on the womb and its appendages, and the perforations in the tubes forming the blades furnish means for conducting a continuous spray of liquid to the parts during an operation to clear away the debris and clots from the parts operated upon, so that this speculum is particularly adapted for use in surgical operations as well as for a syringe.

It will be observed that the speculum is thus adapted to be used as a syringe or for spray purposes, as well as the ordinary purposes for which a speculum is used, thus lessening the work of a physician or surgeon using it.

Having thus described my invention, what I claim as new, and desire to secure by Letters Patent, is as follows, to wit:

The speculum shown and described comprising the combination of the blades A and B hinged together and formed of tubes throughout their length, the tubes of each blade being intercommunicably connected at the point of the blade, and having perforations for discharging liquid material, the tubular members of each blade extending rearward from the hinges to form tubular handles adapted to connect with supply-tubes, and means for holding the blades dilated, substantially as and for the purpose set forth.

CLARK B. PROVINS.

Witnesses:
EDWARD J. KELLY,
JAMES CROKER.